US010540427B2

(12) United States Patent
Dickson et al.

(10) Patent No.: US 10,540,427 B2
(45) Date of Patent: Jan. 21, 2020

(54) AUTOMATED FILE MERGING THROUGH CONTENT CLASSIFICATION

(75) Inventors: Mary Lou Dickson, Durham, NC (US); Wesley Gyure, Durham, NC (US); Hao Q. La, Durham, NC (US); Anne F. Ross, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 12/651,114

(22) Filed: Dec. 31, 2009

(65) Prior Publication Data

US 2011/0161376 A1 Jun. 30, 2011

(51) Int. Cl.
*G06F 7/00* (2006.01)
*G06F 17/22* (2006.01)
*G06F 16/21* (2019.01)

(52) U.S. Cl.
CPC ........ *G06F 17/2288* (2013.01); *G06F 16/219* (2019.01)

(58) Field of Classification Search
CPC .......................... G06F 17/30575; G06F 16/219
USPC ................................. 707/803, 616, 808, 806
See application file for complete search history.

(56) References Cited

U.S. PATENT DOCUMENTS

| | | | | |
|---|---|---|---|---|
| 7,689,623 B1 * | 3/2010 | Liu | ........................... | G06F 7/36 707/752 |
| 2006/0123033 A1 * | 6/2006 | Livshits | .................... | G06F 8/71 707/707 |
| 2006/0242183 A1 * | 10/2006 | Niyogi | ................ | G06F 9/44505 707/707 |
| 2008/0189308 A1 * | 8/2008 | Sangal | ...................... | G06F 8/20 707/707 |
| 2009/0172041 A1 * | 7/2009 | Clarke | .................. | G06F 16/172 707/707 |

OTHER PUBLICATIONS

Wikipedia; "Merge (Revision Control)"; http://en.wikipedia.org/wiki/Merge_(revision_control); last visited on Dec. 10, 2009.

* cited by examiner

*Primary Examiner* — Alexandria Bromell
(74) *Attorney, Agent, or Firm* — Steven M. Greenberg, Esq.; Shutts & Bowen LLP

(57) ABSTRACT

Embodiments of the present invention provide a method, system and computer program product for the automated merger of content in progeny of a primary file in a version control system. In one embodiment of the invention, the method can include establishing different segments of content in a primary file in a merger tool executing in memory by a processor of a host computer and associating each of the segments with a classification corresponding to a particular merger rule selected from amongst different merger rules. The method also can include parsing content in different progeny of the primary file and identifying changes in a parsed portion of the progeny corresponding to a specific one of the segments of the primary file. Finally, the method can include applying to the identified changes a merger rule corresponding to a classification associated with the specific one of the segments.

9 Claims, 2 Drawing Sheets

AUTOMATED FILE MERGING THROUGH CONTENT CLASSIFICATION

BACKGROUND OF THE INVENTION

Field of the Invention

The present invention relates to the field of version control and more particularly to three-way merge tools for version management.

Description of the Related Art

Version control, often referred to as revision control, source control or source code management, pertains to the management of changes to documents, programs, and other information stored as computer files. Version control is most commonly used in software development, where a team of people may apply changes to the same files. Changes applied by different persons can be coded in accordance with the identity of the person applying the change, and also a timestamp indicating when the person made the change. In this way, revisions to the file by different people can be compared, restored, and with some types of files, merged.

Version control systems are most commonly stand-alone applications, but version control also has been is also embedded in different other applications, including word processors, spreadsheets, software development environments and document management systems. Generally, by integrating version control into other applications, end users can revert a document to a previous revision, which is critical for allowing editors to track the document edits of one another and correct mistakes in documents. With respect specifically to software development, version control has been recognized as important in organizing multi-developer software development projects.

As present version control for multi-developer software development projects produces a comparison of different progeny of a primary document. The comparison can result in identified changes to the primary file in each of the progeny. Once identified, the end user can manually merge the changes at the discretion of the end user into a merge file. Generally, when two progeny result from a single primary file, the process of merging changes in each of the two progeny is referred to as a "three way merge". In a three-way merge, to the extent that a same portion of the primary file has changed differently in different progeny, the end user can manually select which changes are incorporated for the portion in the merge file. It will be recognized, then, that the process of version control for software development is automated only to the extent that differences can be detected between documents, but otherwise the process of version control is a highly manual and quite tedious process.

BRIEF SUMMARY OF THE INVENTION

Embodiments of the present invention address deficiencies of the art in respect to version control and three-way merging and provide a novel and non-obvious method, system and computer program product for the automated merger of content in progeny of a primary file in a version control system. In one embodiment of the invention, the method can include establishing different segments of content in a primary file in a merger tool executing in memory by a processor of a host computer and associating each of the segments with a classification corresponding to a particular merger rule selected from amongst different merger rules. The method also can include parsing content in different progeny of the primary file and identifying changes in a parsed portion of the progeny corresponding to a specific one of the segments of the primary file. Finally, the method can include applying to the identified changes a merger rule corresponding to a classification associated with the specific one of the segments.

Notably, the different merger rules can include each of a rule to merge identified changes in a parsed portion of progeny into a merged file for the primary file without operator intervention, a rule to merge identified changes in a parsed portion of progeny into a merged file for the primary file only after prompting for operator intervention, and a rule to ignore the identified changes in a parsed portion of progeny. Also, as an option, the changes in the parsed portion of the progeny corresponding to specific one of the segments of the primary file can be identified in an order pre-determined for the primary file.

In another embodiment, a version control data processing system can be provided. The system can include a host computer with processor and memory, an operating system executing in the host computer, a file editor operating through the operating system, and a merge utility coupled to the file editor. The merge utility can include program code that when executed by the processor of the host computer establishes different segments of content in a primary file, associates each of the segments with a classification corresponding to a particular merger rule selected from amongst different merger rules, parses content in different progeny of the primary file, identifies changes in a parsed portion of the progeny corresponding to a specific one of the segments of the primary file, and applies to the identified changes a merger rule corresponding to a classification associated with the specific one of the segments.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for the automated merger of content in progeny of a primary file in a version control system. In an embodiment of the invention, segments of content in a primary file can be demarcated and classified. The classification of each segment can include a rule as to how a comparison and merger of changes in the segment in progeny of the primary file should be handled. For example, the classification can include "merge without prompting", "prompt for merge" or "ignore". Optionally, an ordering for the demarcated segments can be determined as to the order of consideration for the segments during a compare and merge operation.

Thereafter, content of progeny of the primary file can be parsed and the portions of the content corresponding to the demarcated segments can be identified. A classification can be determined for each of the demarcated segments, and changes between the content in each section of the progeny and the primary file can be determined. The determined changes for each segment can be merged into a new file according to a rule for the segment corresponding to the classification of the segment. In this way, the tedious process of merging changes from multiple progeny of a primary file into a new file can be simplified and automated.

Figure 1:
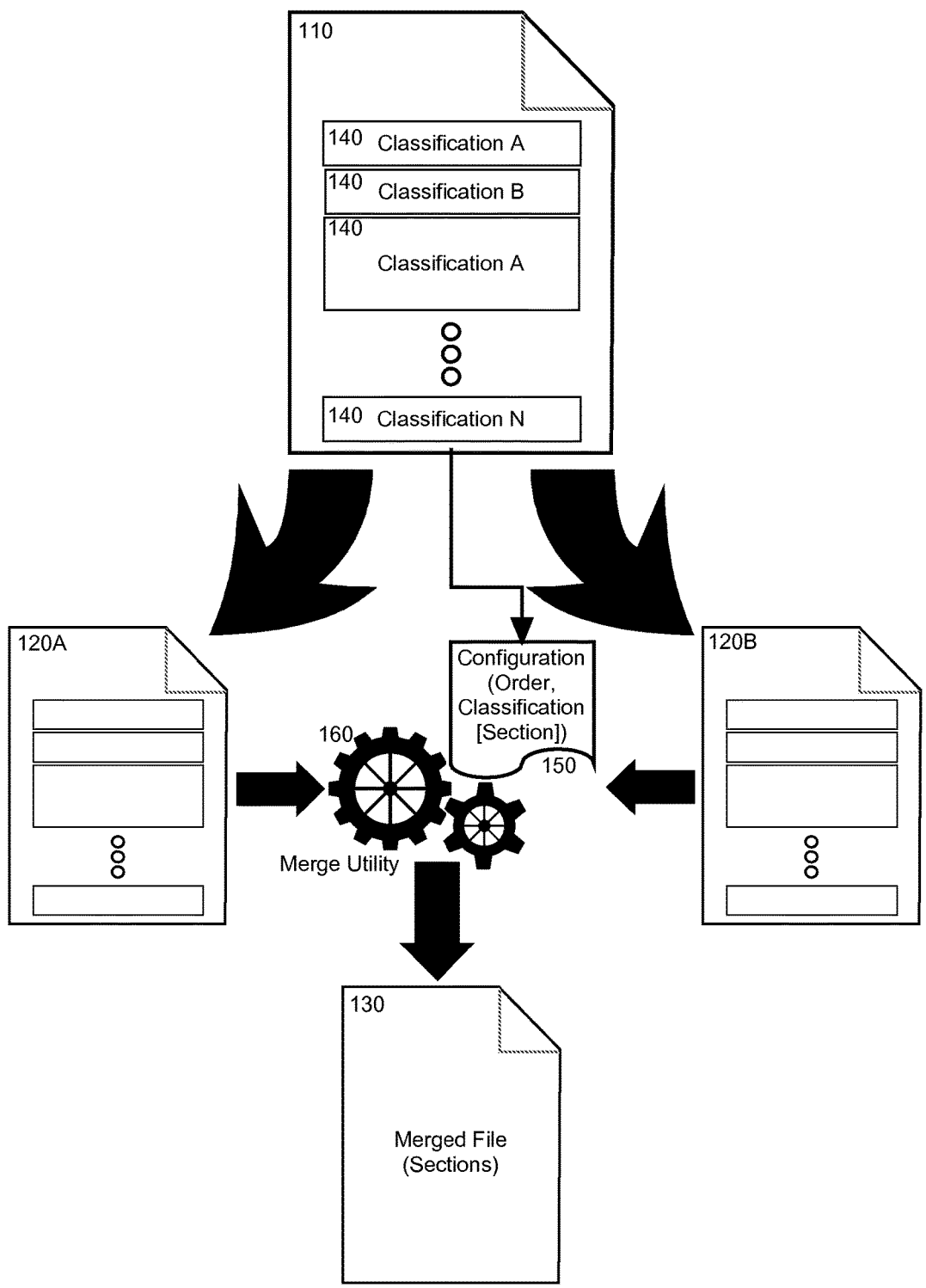
FIG. 1 is a pictorial illustration of a process for automated merger of content in progeny of a primary file in a version control system.

In further illustration, FIG. 1 is a pictorial illustration of a process for automated merger of content in progeny of a primary file in a version control system. As shown in FIG. 1, different segments 140 of content of a primary file 110 can be established, and a classification can be assigned to each of the segments 140. Each distinct classification can refer to a different merge rule, such as merge without prompting, prompt for merge, or ignore. Additionally, an order in which each of the segments 140 in progeny 120A, 120B can be established. Finally, the order and the segments 140 can be stored in a configuration record 150 for the primary file 110.

Thereafter, different progeny 120A, 120B of the primary file 110—namely different files deriving from the primary file separately and independently of one another—can be selected for comparison and merger into a new, merged file 130. Merge utility 160 can parse each of the progeny 120A, 120B (only two progeny shown for ease of illustration) and can correlate different portions of the progeny 120A, 120B with the segments 140 of the primary file 110. Merge utility 160 further can compare each of the different portions of the progeny 120A, 120B with the content of corresponding segments 140 of the primary file 110 to identify changes in each of the progeny 120A, 120B.

Finally, merge utility 160 can apply a merge rule for the changes between the content in the primary file 110 and the progeny 120A, 120B for each segment corresponding to a classification for each segment 140 set forth in the configuration record 150 for the primary file 110. Optionally, each segment processed by the merge utility 160 can be processed in an order specified by the configuration record 150 for the primary file 110. Depending upon the merge rule, the content for a portion of the progeny 120A, 120B corresponding to a segment 140 in the primary file 110 can be merged automatically into the merged file 130, ignored, or a prompt can be generated to prompt an operator to accept or reject the merger of the content into the merged filed 130. The choice specified in response to the prompt optionally can be applied as a preference for the classification in the configuration record 150.

Figure 2:
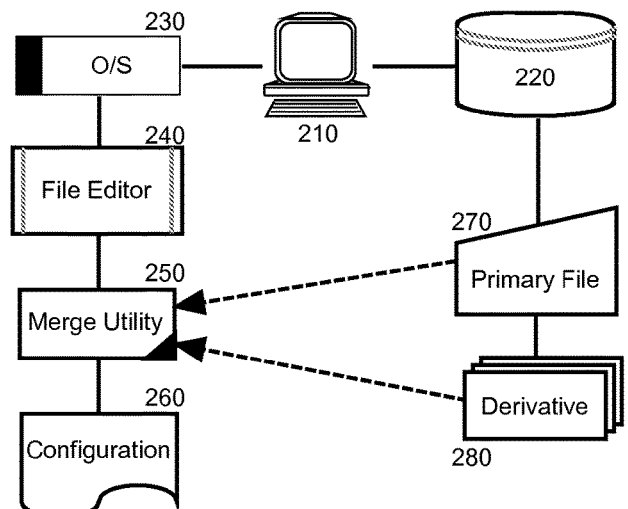
FIG. 2 is a schematic illustration of a version control data processing system configured for automated merger of content in progeny of a primary file; and, FIG. 3 is a method for automated merger of content in progeny of a primary file in a version control system.

The process described in connection with FIG. 1 can be implemented in a version control data processing system. In further illustration, FIG. 2 schematically depicts a version control data processing system configured for automated merger of content in progeny of a primary file. The system can include a host computer 210 with processor and memory supporting the execution of operating system 230. The operating system 230, in turn, can host the operation of a file editor 240 configured to load into memory and edit different files disposed in fixed storage 220.

Of note, a merge utility 250 can be coupled to the file editor 240. The merge utility 250 can include program code that when executed by the processor of the host computer 210 can establish a configuration record 260 for a primary file 270 stored in the fixed storage 220. The configuration record 260 can include a listing of established segments in the primary file 270, a classification assigned to each of the segments in the primary file 270, and optionally an order in which the segments are to processed during a merge operation. The merge utility 250, in turn, can include a correlation between each assigned classification and a corresponding rule for merging changed content in progeny 280 derived from the primary file 270 for a segment of the primary file 270.

The program code of the merge utility 250 also when executed by the processor of the host computer 210 can parse the progeny 280 to identify portions of content for each segment of the primary file 270 set forth in the configuration record 260. Once identified, each portion can be processed in an order set forth by the configuration record 260 to compare the portion to that of the primary file 270. By doing so, the program code of the merge utility 250 can recognize changes for consideration during a merge into a new file for the primary file 270. The actual merger of the changes, however, can depend upon a classification assigned to each segment in the configuration record 260 and a corresponding merger rule for the assigned classification.

Figure 3:
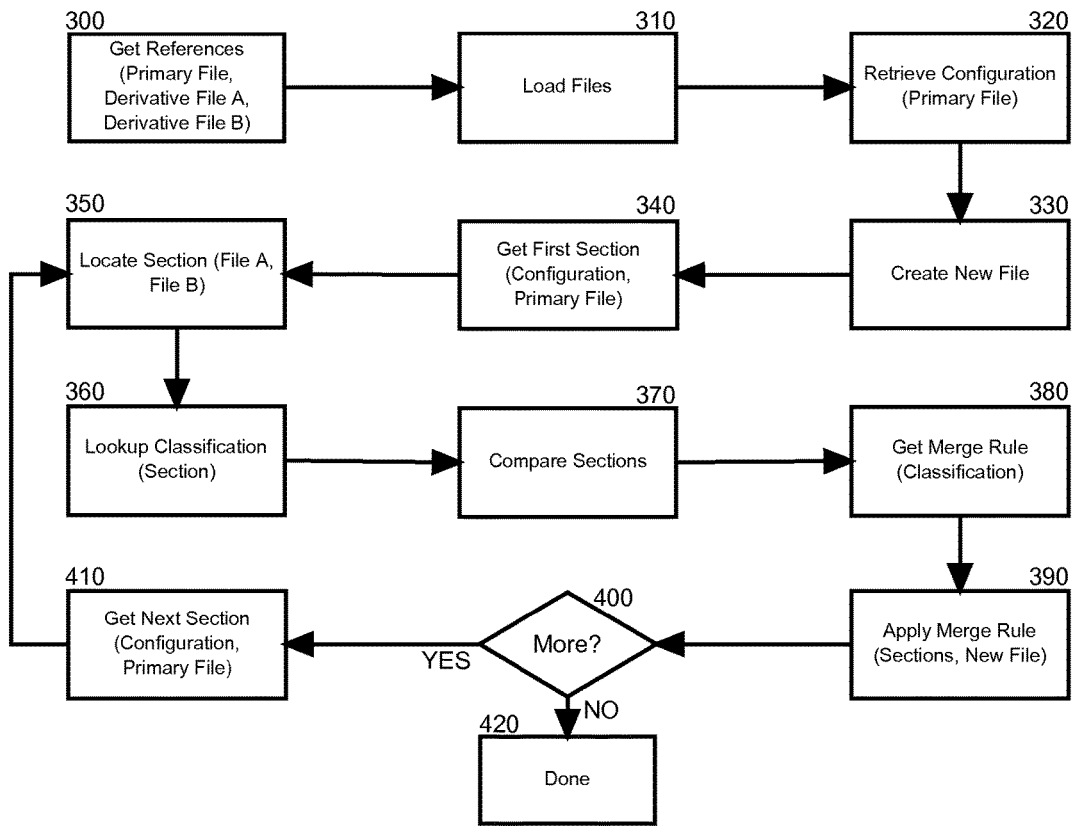

In yet further illustration of the operation of the merger utility 250, FIG. 3 is a method for automated merger of content in progeny of a primary file in a version control system. Beginning in block 300, different references can be received for a primary file and different progeny of the primary file. In block 310, each referenced file can be loaded for processing and in block 320 a configuration record for the primary file can be retrieved. In block 330 a new file to hold merged content from the primary file and the progeny can be created and in block 340, a first segment set forth in the configuration record for the primary file can be selected. In block 350, content for the selected segment can be located in each of the progeny and in block 360, a classification for the selected segment can be determined.

In block 370 content for the selected segment in each of the progeny can be compared to the content of the primary file to determine changes thereto. In block 380, a merger rule corresponding to the classification for the selected segment can be determined and applied in block 390 to the new file. In decision block 400, if additional segments remain to be processed in the progeny, in block 410 a next segment set forth in the configuration record can be selected and the process can repeat through block 350. Otherwise, when no further segments remain to be processed in the progeny, the process can end in block 420.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for automated merger of content in progeny of a primary file in a version control system, the method comprising:
   establishing a configuration record in fixed storage of a host computer for a primary file in a merger tool executing in memory by a processor of the host computer, storing in the configuration record a listing of different segments of content in the primary file, and an order in which the segments are to be processed during a merge operation and assigning a classification to each of the different segments in the configuration record for the primary file;
   creating a new file for holding merged content;
   associating each classification with a particular merger rule selected from amongst a plurality of different merger rules;
   parsing content in different progeny of the primary file;
   identifying changes in a parsed portion of the progeny corresponding to specific ones of the segments of the primary file;
   locating in the configuration record, an order in which the specific ones of the segments in of the primary file are to be processed during a merge operation; and,
   performing the merge operation on the segments by selecting each corresponding one of the specific ones of the segments of the primary file in the order located in the configuration record, and applying a merge rule that corresponds to a classification of the corresponding one of the specific ones of the segments specified in the configuration record so as to place a result of the application of the merge rule in the new file.

2. The method of claim 1, wherein associating each of the segments with a classification corresponding to a particular merger rule selected from amongst a plurality of different merger rules, comprises associating each of the segments with a classification corresponding to a particular merger rule selected from amongst a plurality of different merger rules comprising a rule to merge identified changes in a parsed portion of progeny into a merged file for the primary file without operator intervention, a rule to merge identified changes in a parsed portion of progeny into a merged file for the primary file only after prompting for operator intervention, and a rule to ignore the identified changes in a parsed portion of progeny.

3. The method of claim 1, further comprising identifying changes in a parsed portion of the progeny corresponding to specific ones of the segments of the primary file in the order located in the configuration record.

4. A version control data processing system comprising:
   a host computer with processor and memory;
   an operating system executing in the host computer;
   a file editor operating through the operating system; and,
   a merge utility coupled to the file editor, the merge utility comprising program code that when executed by the processor of the host computer establishes a configuration record in fixed storage of the host computer for a primary file and stores in the configuration record a listing of different segments of content in the primary file, and an order in which the segments are to be processed during a merge operation and assigning a classification to each of the different segments in the configuration record for the primary file, creates a new file for holding merged content, associates each classification with a particular merger rule selected from amongst a plurality of different merger rules, parses content in different progeny of the primary file, identifies changes in a parsed portion of the progeny corresponding to specific ones of the segments of the primary file, locates in the configuration record, an order in which the specific ones of the segments in of the primary file are to be processed during a merge operation, and performs the merge operation on the segments by selecting each corresponding one of the specific ones of the segments of the primary file in the order located in the configuration record, and applies a merge rule that corresponds to a classification of the corresponding one of the specific ones of the segments specified in the configuration record so as to place a result of the application of the merge rule in the new file.

5. The system of claim 4, wherein the merger rules comprises:
   a rule to merge identified changes in a parsed portion of progeny into a merged file for the primary file without operator intervention;
   a rule to merge identified changes in a parsed portion of progeny into a merged file for the primary file only after prompting for operator intervention; and,
   a rule to ignore the identified changes in a parsed portion of progeny.

6. The system of claim 4, wherein the merge utility comprises additional program code enabled to identify the changes in a parsed portion of the progeny corresponding to specific ones of the segments of the primary file in the order located in the configuration record.

7. A computer program product comprising a non-transitory computer usable storage medium storing computer usable program code for automated merger of content in progeny of a primary file in a version control system, the computer program product comprising:
   computer usable program code for establishing a configuration record in fixed storage of a host computer for a primary file in a merger tool executing in memory by a processor of the host computer, storing in the configuration record a listing of different segments of content in the primary file, and an order in which the segments are to be processed during a merge operation and assigning a classification to each of the different segments in the configuration record for the primary file;
   computer usable program code for creating a new file for holding merged content;
   computer usable program code for associating each classification with a particular merger rule selected from amongst a plurality of different merger rules;
   computer usable program code for parsing content in different progeny of the primary file;
   computer usable program code for identifying changes in a parsed portion of the progeny corresponding to specific ones of the segments of the primary file;
   computer usable program code for locating in the configuration record, an order in which the specific ones of the segments in of the primary file are to be processed during a merge operation; and,
   computer usable program code for performing the merge operation on the segments by selecting each corresponding one of the specific ones of the segments of the primary file in the order located in the configuration record, and applying a merge rule that corresponds to a classification of the corresponding one of the specific ones of the segments specified in the configuration record so as to place a result of the application of the merge rule in the new file.

8. The computer program product of claim 7, wherein the computer usable program code for associating each of the segments with a classification corresponding to a particular merger rule selected from amongst a plurality of different merger rules, comprises computer usable program code for associating each of the segments with a classification corresponding to a particular merger rule selected from amongst a plurality of different merger rules comprising a rule to merge identified changes in a parsed portion of progeny into a merged file for the primary file without operator intervention, a rule to merge identified changes in a parsed portion of progeny into a merged file for the primary file only after prompting for operator intervention, and a rule to ignore the identified changes in a parsed portion of progeny.

9. The computer program product of claim 7, further comprising computer usable program code for identifying changes in a parsed portion of the progeny corresponding to specific ones of the segments of the primary file in the order located in the configuration record.

\* \* \* \* \*